(12) United States Patent
Sharma et al.

(10) Patent No.: US 12,306,062 B1
(45) Date of Patent: *May 20, 2025

(54) WINDSHIELD DISPLAY AND TESTING SYSTEM

(71) Applicant: GM Global Technology Operations LLC, Detroit, MI (US)

(72) Inventors: Manoj Kumar Sharma, Troy, MI (US); Joseph F. Szczerba, Grand Blanc, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,225

(22) Filed: Nov. 21, 2023

(51) Int. Cl.
*G09G 3/34* (2006.01)
*G01M 11/00* (2006.01)
*G02B 27/01* (2006.01)

(52) U.S. Cl.
CPC ......... *G01M 11/30* (2013.01); *G02B 27/0101* (2013.01); *G09G 3/3406* (2013.01); *G09G 2360/144* (2013.01); *G09G 2360/145* (2013.01); *G09G 2380/10* (2013.01)

(58) Field of Classification Search
CPC ...... G01M 11/00; G01M 11/02; G01M 11/04; G02B 27/0101; G02B 27/0172; G09G 3/3406; G09G 2380/10; G09G 3/002
See application file for complete search history.

(56) References Cited

U.S. PATENT DOCUMENTS

| | | | |
|---|---|---|---|
| 4,930,049 A | 5/1990 | Davenport et al. | |
| 10,222,529 B1 | 3/2019 | Cohoon et al. | |
| 11,951,905 B1* | 4/2024 | Weiss | G02B 6/0008 |
| 2018/0142860 A1* | 5/2018 | Potter | F21S 43/243 |
| 2019/0016262 A1* | 1/2019 | Thiebaud | B60Q 3/78 |

FOREIGN PATENT DOCUMENTS

WO   WO 2014176474 A1 * 10/2014   ............. B60K 35/00

OTHER PUBLICATIONS

United States Patent and Trademark Office. U.S. Appl. No. 18/357,697, filed Jul. 24, 2023.

* cited by examiner

*Primary Examiner* — Matthew A Eason
*Assistant Examiner* — Scott D Au
(74) *Attorney, Agent, or Firm* — Vivacqua Crane, PLLC

(57) ABSTRACT

A display and testing system for a vehicle having a display surface. A light source emits a light when activated. A fiber-optic cable with opposite first and second fiber ends. The first fiber end receives light from the light source is directed to the second fiber end which emits the light to the display surface. A piezoelectric actuator is coupled to the fiber-optic cable adjacent the second fiber end and when actuated vibrates the second fiber end to project an image on the display surface while the light source is activated. A photodetector is configured to detect light and the second fiber end receives the image reflected from the display surface and directs the image to the first fiber end. The first fiber end emits and directs the image to the photodetector. The photodetector detects functionality of the display surface based on the image while the light source is activated.

20 Claims, 4 Drawing Sheets

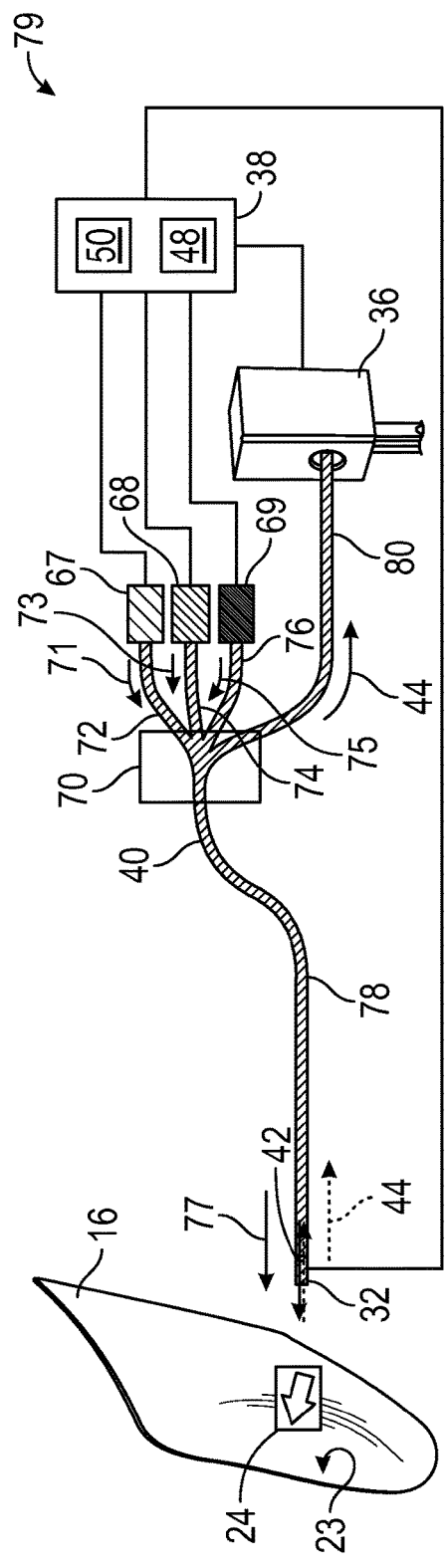
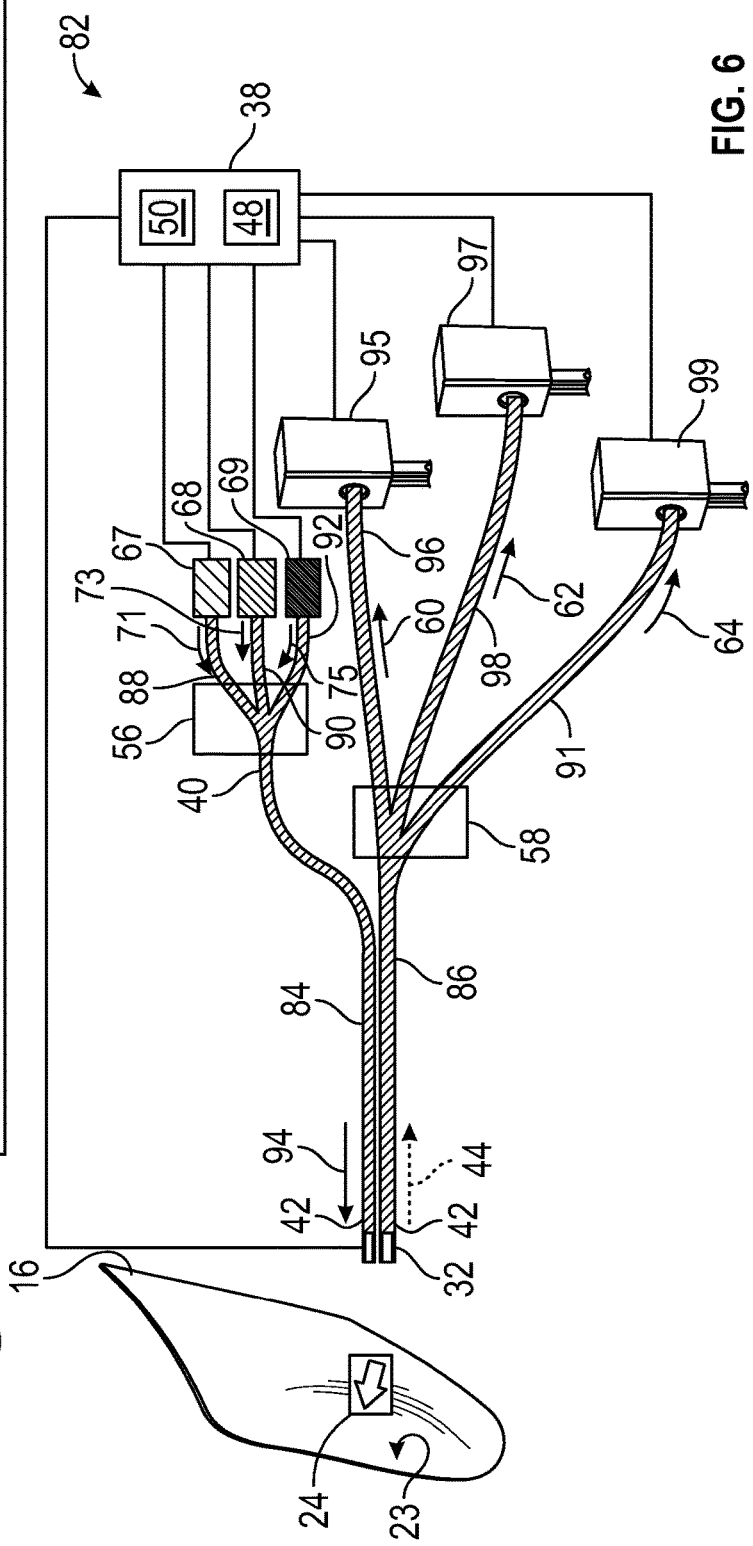

WINDSHIELD DISPLAY AND TESTING SYSTEM

INTRODUCTION

The present disclosure relates to a windshield display and testing system for a vehicle.

Some vehicles include a display for presenting information to the vehicle occupant. Testing the display is done with a dedicated camera with a digital light processor. However, the use of a dedicated camera requires a specific camera location in the vehicle interior relative to the display location. This in turn can limit the location of the display to areas that can be detected by the dedicated camera. The dedicated camera can also impair portions of the vehicle interior. Thus, while these dedicated cameras can test some vehicle displays, there is a need in the art for a new and improved means to test vehicle displays that can allow for more display options and interior locations.

SUMMARY

A display and testing system for a vehicle having a display surface is provided. The system includes a light source configured to emit a light when activated, a fiber-optic cable having a first fiber end and a second fiber end opposite the first fiber end, the first fiber end receiving the light from the light source and directing the light from the light source to the second fiber end, and the second fiber end emitting the light to the display surface, a piezoelectric actuator coupled to the fiber-optic cable adjacent the second fiber end, wherein the piezoelectric actuator is actuated to vibrate the second fiber end to project an image on the display surface while the light source is activated, and a photodetector configured to detect light, wherein the second fiber end receives the image reflected from the display surface and directs the image to the first fiber end, the first fiber end emits and directs the image to the photodetector, and the photodetector detects functionality of the display surface based on the image while the light source is activated.

In one aspect, a dichroic mirror is adjacent the first fiber end, wherein the light source emits the light to the dichroic mirror, the dichroic mirror directs the light from the light source into the first fiber end, and the dichroic mirror allows the image emitted from the first fiber end to pass through the dichroic mirror to the photodetector.

In another aspect, a bandpass filter is disposed between the dichroic mirror and the photodetector, wherein the bandpass filter receives the image from the dichroic mirror, filters the image, and directs a filtered image to the photodetector.

In another aspect, a fiber-optic combiner/separator is coupled to the first fiber end, the light source, and the photodetector, wherein the fiber-optic combiner/separator directs the light from the light source to the first fiber end and directs the image emitted from the first fiber end to the photodetector.

In another aspect, a bandpass filter is disposed between the photodetector and the fiber-optic combiner/separator, wherein the bandpass filter receives the image from the fiber-optic combiner/separator, filters the image, and directs a filtered image to the photodetector.

In another aspect, a controller is in electrical communication with the light source and the photodetector, the controller including a processor and a memory, the memory including instructions such that the processor is programmed to: activate and deactivate the light source, determine ambient illumination of the display surface by deactivating the light source and measuring the light received by the photodetector, and determine the functionality of the display surface displaying the image by activating the light source, measuring the image received by the photodetector and subtracting the ambient illumination such that the image based solely on the light source is determined and the functionality of the display surface displaying the image is determined.

In another embodiment, a display and testing system for a vehicle having a display surface is provided. The system includes a light source configured to emit a light when activated, a first fiber-optic cable and a second fiber-optic cable each having a first fiber end and a second fiber end opposite the first fiber end, the first fiber-optic cable first fiber end receiving the light from the light source and directing the light from the light source to the first fiber-optic cable second fiber end, and the first fiber-optic cable second fiber end emitting the light to the display surface, a piezoelectric actuator coupled to the first fiber-optic cable adjacent the first fiber-optic cable second fiber end and to the second fiber-optic cable adjacent the second fiber-optic cable second fiber end, wherein the piezoelectric actuator is actuated to vibrate the first fiber-optic cable second fiber end to project an image on the display surface while the light source is activated and to vibrate the second fiber-optic cable second fiber end with the first fiber-optic cable second fiber end, and a photodetector configured to detect light, wherein the second fiber-optic cable second fiber end receives the image reflected from the display surface and directs the image to the second fiber-optic cable first fiber end, the second fiber-optic cable first fiber end emits and directs the image to the photodetector, and the photodetector detects functionality of the display surface based on the image while the light source is activated.

In one aspect, a controller is in electrical communication with the light source, the photodetector, and the piezoelectric actuator, the controller including a processor and a memory, the memory including instructions such that the processor is programmed to: activate and deactivate the light source, activate the piezoelectric actuator to vibrate the first fiber-optic cable second fiber end to project an image on the display surface while the light source is activated, and determine the functionality of the piezoelectric actuator vibrating both the first fiber-optic cable and the second fiber-optic cable by determining that an image from the display surface is received by the photodetector when the light source is activated and the piezoelectric actuator vibration is activated.

In another aspect, a bandpass filter is disposed between the second fiber-optic cable first fiber end and the photodetector, wherein the bandpass filter receives the image from the second fiber-optic cable first fiber end, filters the image, and directs a filtered image to the photodetector.

In another aspect, a controller in electrical communication with the light source and the photodetector, the controller including a processor and a memory, the memory including instructions such that the processor is programmed to: activate and deactivate the light source, determine ambient illumination of the display surface by deactivating the light source and measuring the light received by the photodetector, and determine the functionality of the display surface displaying the image by activating the light source, measuring the image received by the photodetector and subtracting the ambient illumination such that the image based solely on the light source is determined and the functionality of the display surface displaying the image is determined.

In another embodiment, a display and testing system for a vehicle having a display surface is provided. The system includes a first light source configured to emit a first light when activated into a first fiber-optic cable, a second light source configured to emit a second light when activated into a second fiber-optic cable, the second light being different than the first light, a third light source configured to emit a third light when activated into a third fiber-optic cable, the third light being different than the first light and the second light, a first photodetector configured to detect light received from a fourth fiber-optic cable, and a piezoelectric actuator. When the first light source, the second light source, and the third light source are activated, the respective first light, second light, and third light are emitted to the display surface, the piezoelectric actuator vibrates to cause the first light, the second light, and the third light to project an image on the display surface, and the first photodetector receives the image reflected from the display surface via the fourth fiber-optic cable and detects functionality of the display surface based on the image while at least one of the light sources is activated.

In one aspect, a fifth fiber-optic cable has a first fiber end and a second fiber end opposite the first fiber end and a fiber-optic combiner/separator is operable to combine light received from multiple fiber-optic cables and to separate received light between multiple fiber-optic cables. The first fiber-optic cable, the second fiber-optic cable, and the third fiber-optic cable emit the first light, the second light, and the third light to the fiber-optic combiner/separator, the fiber-optic combiner/separator directs the received first light, second light, and third light into the first fiber end, the first fiber end directs light received from the fiber-optic combiner/separator to the second fiber end, the piezoelectric actuator is coupled to the fifth fiber-optic cable adjacent the second fiber end and vibrates the second fiber end when actuated, the second fiber end emits the light received from the first fiber end to the display surface, the second fiber end receives the image reflected from the display surface and directs the image to the first fiber end, the first fiber end emits the image to the fiber-optic combiner/separator, and the fiber-optic combiner/separator directs the image to the first photodetector through the fourth fiber-optic cable.

In another aspect, a controller is in electrical communication with the light sources, the piezoelectric actuator, and the first photodetector, the controller including a processor and a memory, the memory including instructions such that the processor is programmed to: activate and deactivate the light sources, determine ambient illumination of the display surface by deactivating the light sources and measuring the light received by the first photodetector, and determine the functionality of the display surface displaying the image by activating the light sources, measuring the image received by the first photodetector and subtracting the ambient illumination such that the image based solely on the light sources is determined and the functionality of the display surface displaying the image is determined.

In another aspect, a controller is in electrical communication with the light sources, the piezoelectric actuator, and the first photodetector, the controller including a processor and a memory, the memory including instructions such that the processor is programmed to: to separately activate and deactivate the light sources so that a single light source can be activated while all other light sources are deactivated, determine the functionality of the display surface displaying the image with respect to the first light source by activating the first light source while the second light source and the third light source are deactivated and measuring the image received by the first photodetector, determine the functionality of the display surface displaying the image with respect to the second light source by activating the second light source while the first light source and the third light source are deactivated and measuring the image received by the first photodetector, and determine the functionality of the display surface displaying the image with respect to the third light source by activating the third light source while the first light source and the second light source are deactivated and measuring the image received by the first photodetector.

In another aspect, a second photodetector is configured to detect light received from a fifth fiber-optic cable, a third photodetector is configured to detect light received from a sixth fiber-optic cable, and a seventh fiber-optic cable and an eighth fiber-optic cable each having a first fiber end and a second fiber end opposite the first fiber end. The seventh fiber-optic cable first fiber end receives the first light, the second light, and the third light and directs received light to the seventh fiber-optic cable second fiber end, the seventh fiber-optic cable second fiber end emits the received light to the display surface, the piezoelectric actuator is coupled to the seventh fiber-optic cable adjacent the seventh fiber-optic cable second fiber end and to the eighth fiber-optic cable adjacent the eighth fiber-optic cable second fiber end, the piezoelectric actuator is actuated to vibrate the seventh fiber-optic cable second fiber end to project an image on the display surface while the light sources are activated and to vibrate the eighth fiber-optic cable second fiber end with the seventh fiber-optic cable second fiber end, the eighth fiber-optic cable second fiber end receives the image reflected from the display surface and directs the image to the eighth fiber-optic cable first fiber end, the eighth fiber-optic cable first fiber end directs the image to the photodetectors, and the photodetectors detect functionality of the display surface based on the image received while the light sources are activated.

In another aspect, a fiber-optic combiner is coupled to the first, second and third fiber-optic cables to the seventh fiber-optic cable first fiber end and directing the first, second, and third lights into the seventh fiber-optic cable first fiber end.

In another aspect, each photodetector is configured to detect different light wavelengths and further comprising a bandpass filter receiving the image from the eighth fiber-optic cable first fiber end, the bandpass filter filtering the image into three different filtered images, and sending a first filtered image to the first photodetector, a second filtered image to the second photodetector, and a third filtered image to the third photodetector.

In another aspect, a controller is in electrical communication with the light sources, the piezoelectric actuator, and the photodetectors, the controller including a processor and a memory, the memory including instructions such that the processor is programmed to: activate and deactivate the light sources, determine ambient illumination of the display surface by deactivating the light sources and measuring the light received by the photodetectors, and determine the functionality of the display surface displaying the image by activating the light sources, measuring the image received by the photodetectors and subtracting the ambient illumination such that the image based solely on the light sources is determined and the functionality of the display surface displaying the image is determined.

In another aspect, a controller is in electrical communication with the light sources, the photodetectors, and the piezoelectric actuator, the controller including a processor and a memory, the memory including instructions such that the processor is programmed to: activate and deactivate the light sources, activate the piezoelectric actuator to vibrate the seventh fiber-optic cable second fiber end to project the image on the display surface while one or more of the light sources are activated and vibrate the eighth fiber-optic cable second fiber end with the seventh fiber-optic cable second fiber end, and determine the functionality of the piezoelectric actuator vibrating both the seventh fiber-optic cable second fiber end and the eighth fiber-optic cable second fiber end by determining that an image from the display surface is received by one or more of the photodetectors when one or more of the light sources are activated and the piezoelectric actuator vibration is activated.

In another aspect, a controller is in electrical communication with the light sources, the piezoelectric actuator, and the photodetectors, the controller including a processor and a memory, the memory including instructions such that the processor is programmed to: to separately activate and deactivate the light sources so that a single light source can be activated while all other light sources are deactivated, determine the functionality of the display surface displaying the image with respect to the first light source by activating the first light source while the second light source and the third light source are deactivated and measuring the image received by the first photodetector, determine the functionality of the display surface displaying the image with respect to the second light source by activating the second light source while the first light source and the third light source are deactivated and measuring the image received by the second photodetector, and determine the functionality of the display surface displaying the image with respect to the third light source by activating the third light source while the first light source and the second light source are deactivated and measuring the image received by the third photodetector.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a schematic view of a display and testing system according to an exemplary embodiment;

FIG. 6 is a schematic view of a display and testing system according to an exemplary embodiment;

DETAILED DESCRIPTION

The following description is merely exemplary in nature and is not intended to limit the present disclosure, application, or uses.

Figure 1:
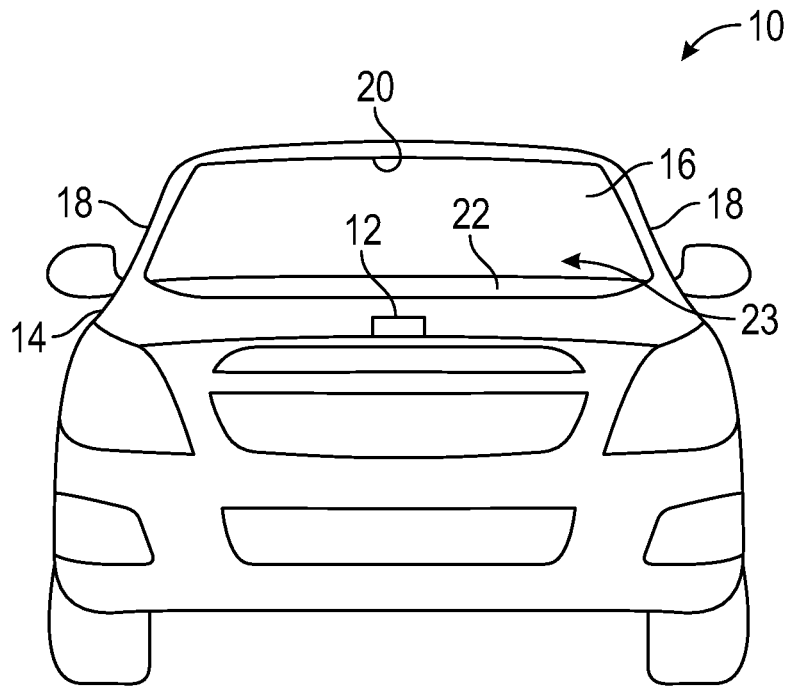
FIG. 1 is a schematic front view of an exemplary vehicle having a display and testing system according to an aspect of the present disclosure.

Referring to FIG. 1, an exemplary vehicle 10 including a display and testing system 12 according to the present disclosure is shown. Although the vehicle 10 is shown as a sedan, it is envisioned that that vehicle 10 may be any other type of vehicle, such as a pickup truck, a coupe, a sport utility vehicle (SUVs), a recreational vehicle (RVs), aircraft, marine craft, and other vehicles. The vehicle 10 includes a vehicle body 14, a windshield 16, one or more A-pillars 18, a headliner 20, and a dashboard 22. The vehicle body 14 and the A-pillars 18 support the windshield 16. The windshield 16 functions as a display surface 23 for the vehicle 10 and includes particles or films that fluoresce in response to being excited by a particular light to produce an image on the windshield 16. However, it should be appreciated that other surfaces in the vehicle 10 may act as the display surface 23, such as the A-pillars 18, the headliner 20, the dashboard 22, etc. Where the display surface 23 is the windshield 16, the transparent phosphors may be included in the windshield 16. The transparent phosphors are light emitting particles which fluoresce in response to being excited by ultraviolet light and can produce an image on the windshield 16 that can be viewed by an occupant of the vehicle 10. The transparent phosphors can include various colors, such as red, green, and blue to allow a full color image. Other light emitting particles or films that fluoresce in response to other light sources may be included in the windshield 16.

As described below, the display and testing system 12 is configured to project light onto the display surface 23 and generate images on the display surface 23 on the windshield 16. The display and testing system 12 can test the functionality of the display surface 23 displaying the images and the functionality of other components of the display and testing system 12.

Figure 2:
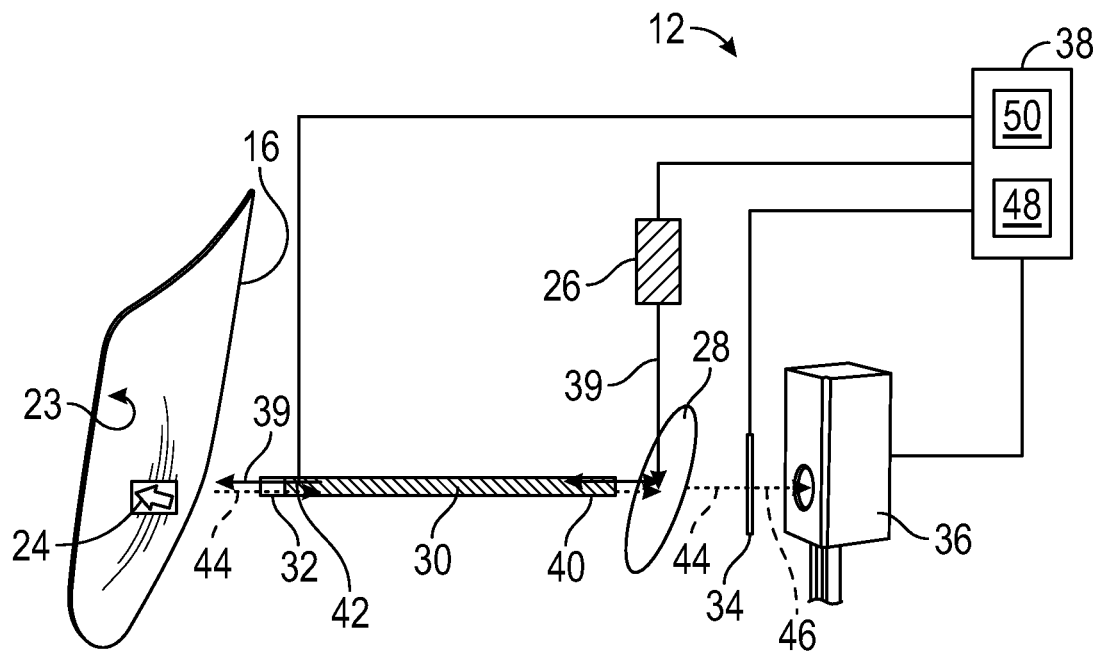
FIG. 2 is a schematic view of a display and testing system according to an exemplary embodiment.

Referring to FIG. 2, the display and testing system 12 according to an exemplary embodiment is shown for displaying an image 24 on the display surface 23 on the windshield 16 and testing the functionality of the display surface 23 displaying the image 24. The display and testing system 12 includes a light source 26, a dichroic mirror 28, a fiber-optic cable 30, a piezoelectric actuator 32, a bandpass filter 34, a photodetector 36, and a controller 38.

The dichroic mirror is adjacent the light source 26 and the light source 26 when activated emits a light 39 to the dichroic mirror 28. The light 39 emitted by the light source 26 is based on the capabilities of the light source 26 and can be different between different light sources 26. As a non-limiting example, the light source 26 can be configured to emit a green light, a red light, a blue light, or a light of other wavelengths, or may be configured to be capable to emit light of differing wavelengths such that it may emit a light of a first wavelength or emit a light of a second wavelength different than the first wavelength.

The dichroic mirror 28 is a component that is operable to transmit light having a wavelength within a configured transmission band and reflect light of all other wavelengths. The dichroic mirror 28 is located in a position to receive the light 39 from the light source 26 and oriented to direct the light 39 via reflection to the fiber-optic cable 30.

Fiber-optic cables are configured to transmit or carry light. The fiber-optic cable 30 may be flexible and long enough to facilitate very small packaging and placement of components of the display and testing system 12 in a variety of locations in the vehicle 10. As a non-limiting example, the fiber-optic cable 30 may be between ten and twenty feet long. The fiber-optic cable 30 includes a first fiber end 40 and a second fiber end 42 opposite the first end 40. The first fiber end 40 receives the light 39 from the dichroic mirror 28 and carries the light 39 to the second fiber end 42. The second fiber end 42 emits the light 39 to the display surface 23 on the windshield 16.

The piezoelectric actuator 32 is a device that converts an electrical signal into a precisely controlled physical displacement. The piezoelectric actuator 32 is coupled to the fiber-optic cable 30 at a location adjacent to the second fiber end 42. The piezoelectric actuator 32 is controlled using an algorithm to create/project required images and when actuated vibrates the second fiber end 42 to project the image 24 on the display surface 23 on the windshield 16 so that an occupant of the vehicle 10 can see the image 24. As a non-limiting example, the image 24 may contain details (tell tales) about the operation or condition of the vehicle 10.

During testing of the display surface 23, the second fiber end 42 receives a light 44 from the windshield 16. The light 44 includes ambient illumination that passes through the windshield 16 and when the light source 26 is activated and the image 24 is projected on the display surface 23 the light 44 will also include the image reflected from the display surface 23 on the windshield 16. The fiber-optic cable 30 carries the light 44 from the second fiber end 42 to the first fiber end 40. The first fiber end 40 emits the light 44 to the dichroic mirror 28 and the dichroic mirror 28 allows the light 44 to pass through to the bandpass filter 34.

The bandpass filter 34 may be a fixed filter or an adjustable filter to filter the light 44 so that a desired filtered light 46 passes through the bandpass filter 34. The filtered light 46 may also be referred to as a filtered image based on the light 44 containing an image and being filtered. For example, the desired filtered light 46 may match the wavelength of the light 39 emitted by the light source 26 or the expected wavelength of the image reflected from the display surface 23 on the windshield 16 that is included in the light 44 when the display surface 23 of the windshield 16 is functioning properly. The bandpass filter 34, if adjustable, may be controllable so that different desired filtered light 46 can pass through and, as a non-limiting example, may allow the filtered light 46 to be the same as the light 44 in order to avoid filtering the light 44 when desired. As a non-limiting example, the bandpass filter 34 may be absorptive and absorb unwanted light. The bandpass filter 34 may include multiple layers of dielectric coatings applied to a substrate. Further, the bandpass filter 34 may include spectral and absorption filters that are produced by a combination of lamination, cemented layers, and thin film coatings. The bandpass filter 34 directs the filtered light 46 to the photodetector 36.

The photodetector 36 is a device that has one or more sensors that are operable to convert the photon energy of received light into an electrical signal. The electrical signal can be further processed or stored. The photodetector 36, in conjunction with the controller 38 as needed, is operable to measure received light and determine properties of the received light such as intensity, power, intensity distribution, wavefront shape, energy, and wavelength.

The controller 38 is connected to the light source 26, the piezoelectric actuator 32, the bandpass filter 34, and the photodetector 36. The controller 38 controls the operation of the display and testing system 12 for displaying the image 24 on the display surface 23 on the windshield 16 and testing the functionality of the display surface 23 displaying the image 24. The controller 38 is operable to activate and deactivate the light source 26, actuate the piezoelectric actuator 32 to project the image 24, control the bandpass filter 34 if adjustable to achieve a desired filtered light 46, and measure the light received by the photodetector 36.

The controller 38 includes at least one processor 48 and a non-transitory computer readable storage device or media 50. The processor 48 may be a custom made or commercially available processor, a central processing unit (CPU), a graphics processing unit (GPU), an auxiliary processor among several processors associated with the vehicle 10, a semiconductor-based microprocessor (in the form of a microchip or chip set), a macroprocessor, a combination thereof, or generally a device for executing instructions. The computer readable storage device or media 50 may include volatile and nonvolatile storage in read-only memory (ROM), random-access memory (RAM), and keep-alive memory (KAM), for example. KAM is a persistent or non-volatile memory that may be used to store various operating variables while the processor 48 is powered down. The computer-readable storage device or media 50 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by vehicle controllers to control various systems of the vehicle 10. The controller 38 may also consist of multiple controllers which are in electrical communication with each other. The controller 38 may be inter-connected with additional systems and/or controllers of the vehicle 10, allowing the controller 38 to access data of the vehicle 10.

Figure 3:
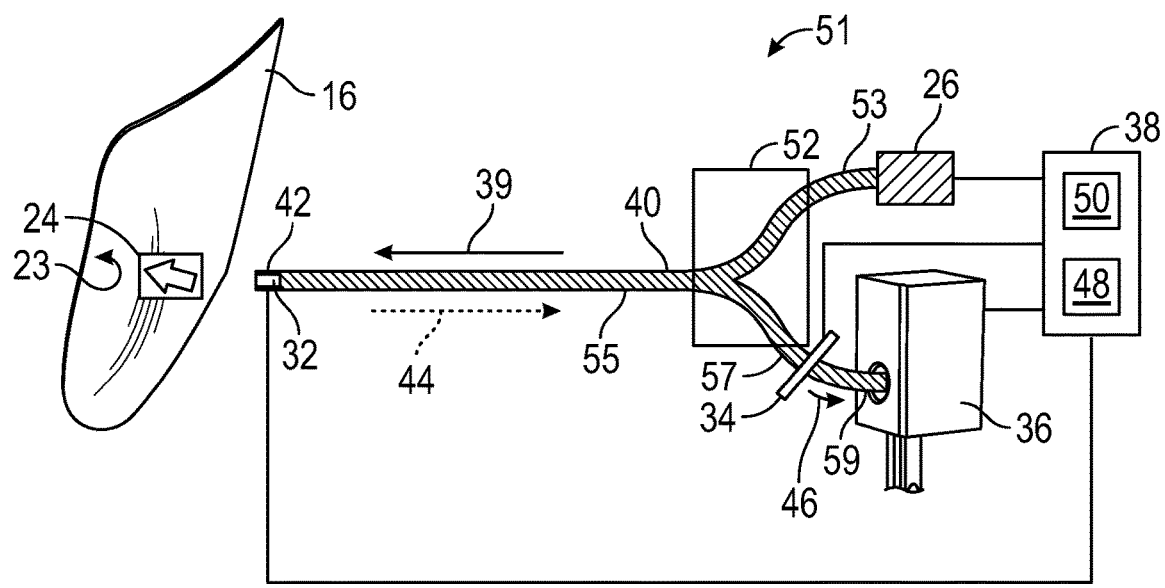
FIG. 3 is a schematic view of a display and testing system according to an exemplary embodiment.

Referring now to FIG. 3, a display and testing system 51 according to another exemplary embodiment is shown for displaying an image 24 on the display surface 23 on the windshield 16 and testing the functionality of the display surface 23 displaying the image 24. The display and testing system 51 is similar to the display and testing system 12 shown in FIG. 2 and like components are indicated by like reference numbers. The display and testing system 51 includes the light source 26, a fiber-optic combiner/separator 52, multiple fiber-optic cables, the piezoelectric actuator 32, the bandpass filter 34, the photodetector 36, and the controller 38.

The fiber-optic combiner/separator 52 is a device to combine multiple fiber-optic cables having one-way (supply or receive) light transmission with a single fiber-optic cable having two-way light transmission that receives and supplies light. The fiber-optic combiner/separator 52 has an input port that can be connected to a fiber-optic cable to receive input light from the fiber-optic cable connected to the input port. The fiber-optic combiner/separator 52 has two-way port that is connected to a fiber-optic cable and transmits the light from the fiber-optic cable connected to the input port to the fiber-optic cable connected to the two-way port and receives a return light from the fiber-optic cable connected to the two-way port. The fiber-optic combiner/separator 52 has an output port connected to a fiber-optic cable and transmits a received return light to the fiber-optic cable connected to the output port.

The light source 26 when activated emits the light 39 to the fiber-optic combiner/separator 52 through a first fiber-optic cable 53. The fiber-optic combiner/separator 52 directs the light 39 to the first fiber end 40 of a second fiber-optic cable 55 that carries the light 39 to the second fiber end 42 and the second fiber end 42 emits the light 39 to the display surface 23 on the windshield 16. The piezoelectric actuator 32 is coupled to the second fiber-optic cable 55 at a location adjacent to the second fiber end 42. The piezoelectric actuator 32 when actuated vibrates the second fiber end 42 to project the image 24 on the display surface 23 on the windshield 16 so that an occupant of the vehicle 10 can see the image 24. The second fiber end 42 receives the light 44 from the windshield 16. The light 44 includes ambient illumination that passes through the windshield 16 and when the light source 26 is activated and the image 24 is projected on the display surface 23 the light 44 will also include the image reflected from the display surface 23 on the windshield 16. The second fiber-optic cable 55 carries the light 44 from the second fiber end 42 to the fiber-optic combiner/separator 52. The fiber-optic combiner/separator 52 directs the light 44 to the bandpass filter 34 through a third fiber-optic cable 57. The bandpass filter 34 if adjustable may be controllable so that different desired filtered light 46 can pass through and may allow the filtered light 46 to be the same as the light 44. The bandpass filter 34 directs the filtered light 46 to the photodetector 36 through a fourth fiber-optic cable 59. The photodetector 36 is operable to measure received light and determine properties of the received light. The controller 38 is connected to the light source 26, the piezoelectric actuator 32, the bandpass filter 34, and the photodetector 36. The controller 38 controls the operation of the display and testing system 51 for displaying the image 24 on the display surface 23 on the windshield 16 and testing the functionality of the display surface 23 displaying the image 24. The controller 38 is operable to activate and deactivate the light source 26, actuate the piezoelectric actuator 32 to project the image 24, control the bandpass filter 34 if adjustable to achieve a desired filtered light 46, and measure the light received by the photodetector 36.

Figure 4:
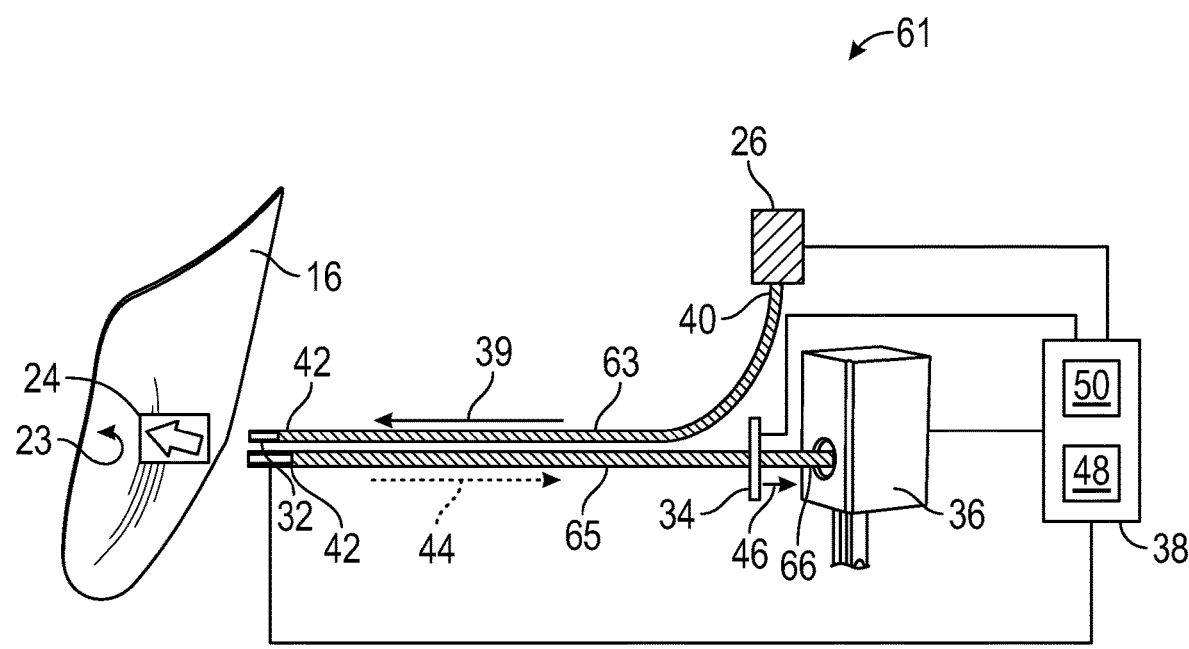
FIG. 4 is a schematic view of a display and testing system according to an exemplary embodiment.

Referring now to FIG. 4, a display and testing system 61 according to another exemplary embodiment is shown for displaying an image 24 on the display surface 23 on the windshield 16 and testing the functionality of the display surface 23 displaying the image 24 and the functionality of the piezoelectric actuator 32 which is configured to simultaneously vibrate both a first fiber-optic cable 63 and a second fiber-optic cable 65. The display and testing system 61 is similar to the display and testing system 12 shown in FIG. 2, the display and testing system 61 shown in FIG. 3, and like components are indicated by like reference numbers. The display and testing system 61 includes the light source 26, the piezoelectric actuator 32, the bandpass filter 34, the photodetector 36, and the controller 38. The light source 26 when activated emits the light 39 to the first fiber end 40 of the first fiber-optic cable 63 that carries the light 39 to the second fiber end 42 and the second fiber end 42 emits the light 39 to the display surface 23 on the windshield 16. The second fiber-optic cable 65 second fiber end 42 receives the light 44 from the windshield 16 and carries the light to the bandpass filter 34. The piezoelectric actuator 32 is coupled to the first fiber-optic cable 63 at a location adjacent to the second fiber end 42 and to the second fiber-optic cable 65 at a location adjacent to the second fiber end 42. The piezoelectric actuator 32 when actuated vibrates the first fiber-optic cable 63 second fiber end 42 to project the image 24 on the display surface 23 on the windshield 16 while the light source 26 is activated and to vibrate the second fiber-optic cable 65 second fiber end 42 with the first fiber-optic cable 63 second fiber end 42. The bandpass filter 34 if adjustable may be controllable so that different desired filtered light 46 can pass through and may allow the filtered light 46 to be the same as the light 44. The bandpass filter 34 directs the filtered light 46 to the photodetector 36 through a third fiber-optic cable 66. The photodetector 36 is operable to measure received light and determine properties of the received light. The controller 38 is connected to the light source 26, the piezoelectric actuator 32, the bandpass filter 34, and the photodetector 36. The controller 38 controls the operation of the display and testing system 61 for displaying the image 24 on the display surface 23 of the windshield 16, testing the functionality of the display surface 23 displaying the image 24, and the functionality of the piezoelectric actuator 32 simultaneously vibrating both the first and second fiber-optic cables 63 and 65. The controller 38 is operable to activate and deactivate the light source 26, actuate the piezoelectric actuator 32 to project the image 24 and simultaneously vibrate both the first and second fiber-optic cables 63 and 65, control the bandpass filter 34 if adjustable to achieve a desired filtered light 46, and measure the light received by the photodetector 36.

Referring now to FIG. 5, a display and testing system 79 according to another exemplary embodiment is shown for displaying an image 24 on the display surface 23 on the windshield 16 and testing the functionality of the display surface 23 displaying the image 24. The display and testing system 79 is similar to the display and testing system 12 shown in FIG. 2, the display and testing system 51 shown in FIG. 3, the display and testing system 61 shown in FIG. 4, and like components are indicated by like reference numbers. The display and testing system 79 includes multiple light sources, a fiber-optic combiner/separator 70, multiple fiber-optic cables, the piezoelectric actuator 32, the photodetector 36, and the controller 38.

The fiber-optic combiner/separator 70 is a device to combine multiple fiber-optic cables having one-way (supply or receive) light transmission with a single fiber-optic cable having two-way light transmission that receives and supplies light. The fiber-optic combiner/separator 70 has three input ports that can each be connected to a fiber-optic cable to receive input lights from fiber-optic cables connected to the input ports and combines the input lights received via the input ports into a combined light. The fiber-optic combiner/separator 70 has a two-way port that is connected to a fiber-optic cable and transmits the combined light to the fiber-optic cable connected to the two-way port and receives a return light from the fiber-optic cable connected to the two-way port. The fiber-optic combiner/separator 70 has an output port connected to a fiber-optic cable and transmits a received return light to the fiber-optic cable connected to the output port.

The light sources include a first light source 67 that when activated emits a first light 71 into a first fiber-optic cable 72 that is connected to the fiber-optic combiner/separator 70, a second light source 68 that when activated emits a second light 73 into a second fiber-optic cable 74 that is connected to the fiber-optic combiner/separator 70, and a third light source 69 that when activated emits a third light 75 into a third fiber-optic cable 76 that is connected to the fiber-optic combiner/separator 70. The second light 73 can be different than the first light 71 and the third light 75 can be different than first light 71 and the second light 73. As a non-limiting example, the first light 71 can be a red light, the second light 73 can be a green light, and the third light 75 can be a blue light. The first, second, and third fiber-optic cables 72, 74, and 75 direct the first, second, and third lights 71, 73, and 75 to the fiber-optic combiner/separator 70. The fiber-optic combiner/separator 70 combines the first, second, and third lights 71, 73 and 75 into a combined light 77 and directs the combined light 77 to the first fiber end 40 of a fourth fiber-optic cable 78 that carries the combined light 77 to the second fiber end 42 and the second fiber end 42 emits the combined light 77 to the display surface 23 on the windshield 16. The piezoelectric actuator 32 is coupled to the fourth fiber-optic cable 78 at a location adjacent to the second fiber end 42. The piezoelectric actuator 32 when actuated vibrates the second fiber end 42 to project the image 24 on the display surface 23 on the windshield 16 so that an occupant of the vehicle 10 can see the image 24. The second fiber end 42 receives the light 44 from the windshield 16. The light 44 includes ambient illumination that passes through the windshield 16 and when one or more of the first, second, and third light sources 67, 68, and 69 is activated and the image 24 is projected on the display surface 23 the light 44 will also include the image reflected from the display surface 23 on the windshield 16. The fourth fiber-optic cable 78 carries the light 44 from the second fiber end 42 to the fiber-optic combiner/separator 70. The fiber-optic combiner/separator 70 directs the light 44 to the photodetector 36 through a fifth fiber-optic cable 80. The photodetector 36 is operable to measure the received light 44 and determine properties of the received light 44. The photodetector 36 may be cable of determining the properties of the received light 44 regardless of which or how many of the first, second and third light sources 67, 68, and 69 are activated or may be limited to only determining the properties of the received light 44 based on a specific one of the first, second, and third light sources 67, 68, and 69 being activated. The controller 38 is connected to the first, second and third light sources 67, 68, and 69, the piezoelectric actuator 32, and the photodetector 36. The controller 38 controls the operation of the display and testing system 79 for displaying the image 24 on the display surface 23 on the windshield 16 and testing the functionality of the display surface 23 displaying the image 24. The controller 38 is operable to individually activate and deactivate the first, second and third light sources 67, 68, and 69, actuate the piezoelectric actuator 32 to project the image 24, and measure the light 44 received by the photodetector 36.

Referring now to FIG. 6, a display and testing system 82 according to another exemplary embodiment is shown for displaying an image 24 on the display surface 23 on the windshield 16 and testing the functionality of the display surface 23 displaying the image 24 and the functionality of the piezoelectric actuator 32 which is configured to simultaneously vibrate together a fourth fiber-optic cable 84 and a fifth fiber-optic cable 86. The display and testing system 82 is similar to the display and testing system 12 shown in FIG. 2, the display and testing system 51 shown in FIG. 3, the display and testing system 61 shown in FIG. 4, the display and testing system 79 shown in FIG. 5, and like components are indicated by like reference numbers. The display and testing system 12 includes the first, second, and third light sources 67, 68, and 69, multiple fiber-optic cables, a fiber-optic combiner 56, the piezoelectric actuator 32, a fiber-optic filter/separator 58, multiple photodetectors, and the controller 38.

The fiber-optic combiner 56 is a device to combine multiple fiber-optic cables having one-way light transmission and each supplying light with a single fiber-optic cable having one-way light transmission and receiving light. The fiber-optic combiner 56 has three input ports that can each be connected to a fiber-optic cable to receive input lights from fiber-optic cables connected to the input ports and combines the input lights received via the input ports into a combined light. The fiber-optic combiner 56 has an output port that is connected to a fiber-optic cable and transmits the combined light to the fiber-optic cable connected to the output port.

The fiber-optic filter/separator 58 is a device to combine a single fiber-optic cable having one-way light transmission and supplying light with multiple fiber-optic cables having one-way light transmission and receiving light. The fiber-optic filter/separator 58 has an input port that can be connected to a fiber-optic cable to receive an input light from the fiber-optic cable connected to the input port and filters and separates the received input light into three different filtered lights. The fiber-optic filter/separator 58 has three output ports that can each be connected to a fiber-optic cable and transmits one of the filtered lights to each fiber-optic cable connected to an output port so that each fiber-optic cable connected to an output port receives a different filtered light.

The first light source 67 when activated emits the first light 71 into a first fiber-optic cable 88 that is connected to the fiber-optic combiner 56, the second light source 68 when activated emits the second light 73 into a second fiber-optic cable 90 that is connected to the fiber-optic combiner 56, and the third light source 69 when activated emits the third light 75 into a third fiber-optic cable 92 that is connected to the fiber-optic combiner 56. The second light 73 can be different than the first light 71 and the third light 75 can be different than first light 71 and the second light 73. As a non-limiting example, the first light 71 can be a red light, the second light 73 can be a green light, and the third light 75 can be a blue light. The first, second, and third fiber-optic cables 88, 90, and 92 direct the first, second, and third lights 71, 73, and 75 to the fiber-optic combiner 56. The fiber-optic combiner 56 combines the first, second, and third lights 71, 73, and 75 into a combined light 94 and transmits the combined light 94 into the first fiber end 40 of the fourth fiber-optic cable 84 that carries the combined light 94 to the second fiber end 42 and the second fiber end 42 emits the combined light 94 to the display surface 23 on the windshield 16. The fifth fiber-optic cable 86 second fiber end 42 receives the light 44 from the windshield 16 and carries the light to the fiber-optic filter/separator 58. The piezoelectric actuator 32 is coupled to the fourth fiber-optic cable 84 at a location adjacent to the second fiber end 42 and to the fifth fiber-optic cable 86 at a location adjacent to the second fiber end 42. The piezoelectric actuator 32 when actuated vibrates the fourth fiber-optic cable 84 second fiber end 42 to project the image 24 on the display surface 23 on the windshield 16 while one or more of the first, second, and third light sources 67, 68, and 69 are activated and to vibrate the fifth fiber-optic cable 86 second fiber end 42 with the fourth fiber-optic cable 84 second fiber end 42.

The fiber-optic filter/separator 58 is operable to filter and separate the light 44 into a first filtered light 60, a second filtered light 62, and a third filtered light 64. The first filtered light 60 is transmitted to a first photodetector 95 through a sixth fiber-optic cable 96. The second filtered light 62 is transmitted to a second photodetector 97 through a seventh fiber-optic cable 98. The third filtered light 64 is transmitted to a third photodetector 99 through an eighth fiber-optic cable 91. The filtered light sent to a photodetector can be based on the ability of the photodetector to be able to measure the received light and determine properties of the received light so that the functionality of the display surface 23 displaying an image based on the light provided by an activated light source may be determined. As a non-limiting example, the fiber-optic filter/separator 58 can be configured to process the light 44 and provide: the first filtered light 60 to the first photodetector 95 through the sixth fiber-optic cable 96 that is related to the first light 71 provided by the first light source 67 and matches the ability of the first photodetector 95 to measure and determine the properties of the first filtered light 60; the second filtered light 62 to the second photodetector 97 through the seventh fiber-optic cable 98 that is related to the second light 73 provided by the second light source 68 and matches the ability of the second photodetector 97 to measure and determine the properties of the second filtered light 62; and the third filtered light 64 to the third photodetector 99 through the eighth fiber-optic cable 91 that is related to the third light 75 provided by the third light source 69 and matches the ability of the third photodetector 99 to measure and determine the properties of the third filtered light 64.

The controller 38 controls the operation of the display and testing system 82 for displaying the image 24 on the display surface 23 on the windshield 16, testing the functionality of the display surface 23 displaying the image 24, and the functionality of the piezoelectric actuator 32 simultaneously vibrating both the fourth and fifth fiber-optic cables 84 and 86. The controller 38 is operable to activate and deactivate the first, second, and third light sources 67, 68, and 69, actuate the piezoelectric actuator 32 to project the image 24 and simultaneously vibrate both the fourth and fifth fiber-optic cables 84 and 86, and measure the light received by the first, second, and third photodetectors 95, 97, and 99.

Figure 7:
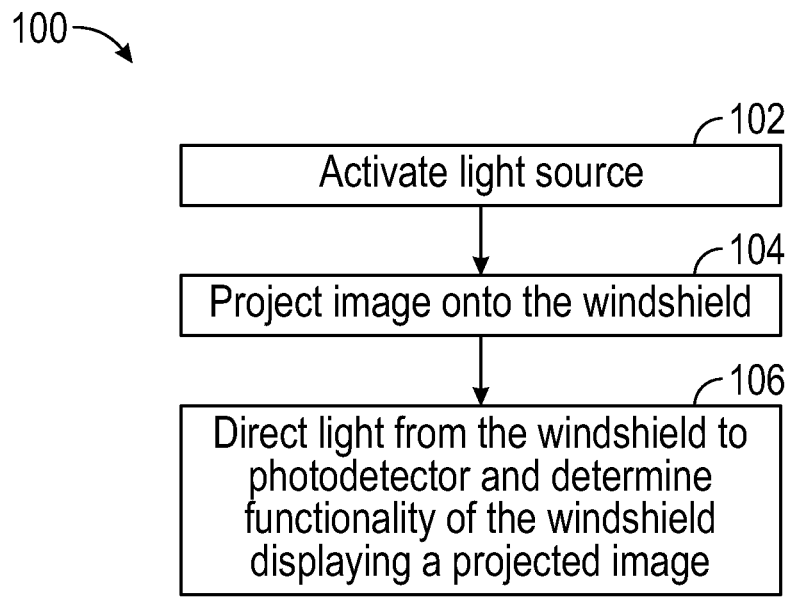
FIG. 7 is a method for using the display and testing systems described in the present disclosure to determine the functionality of the display surface displaying the projected image.

Referring now to FIG. 7, a display testing method 100 for using the display and testing systems 12, 51, 61, 79, and 82 to determine the functionality of the display surface 23 according to the principles of the present disclosure is shown. The display testing method 100 begins at step 102 wherein for the display and testing systems 12, 51 and 61 the controller 38 activates the light source 26 to emit the light 39 and is directed into the associated first, second, and first fiber-optic cable 30, 55, and 63 that directs the light 39 to the second fiber end 42 that emits the light 39 onto the display surface 23, for the display and testing systems 79 and 82 the controller 38 activates at least one of the first, second, and third light sources 67, 68, and 69 to create the lights 77 and 94 that are directed into the associated fourth fiber-optic cables 78 and 84 that directs the light 77 and 94 to the second fiber end 42 that emits the light 39 onto the display surface 23. In the display and testing systems 79 and 82 the controller 38 could activate multiple light sources 67, 68, and 69 that each produce lights 71, 73, and 75 having different properties. As a non-limiting example, the first, second, and third light sources 67, 68, and 69 producing a red light, a blue light, and a green light may be collectively or individually activated by the controller 38 to determine the functionality of the display surface 23 being able to display a projected image 24 created by a red light, a blue light, and a green light. The display testing method 100 then proceeds to step 104.

At step 104, the controller 38 causes the image 24 to be projected onto the display surface 23 of the windshield 16 by activating the piezoelectric actuator 32 using an algorithm that causes the piezoelectric actuator 32 to vibrate the second end 42 of the fiber-optic cable that emits the light to the display surface 23 to create/project required images. For the display and testing systems 12, 51 and 79 the controller 38 activates the piezoelectric actuator 32 to vibrate the second fiber end 42 of the fiber-optic cable 30, the second fiber-optic cable 55, and the fourth fiber-optic cable 78. For the display and testing systems 61 the controller 38 activates the piezoelectric actuator 32 to vibrate together the second fiber ends 42 of first and second fiber-optic cables 63 and 65. For the display and testing system 82 the controller 38 activates the piezoelectric actuator 32 to vibrate together the second fiber ends 42 of the fourth and fifth fiber-optic cables 84 and 86. The display testing method 100 then proceeds to step 106.

At step 106, the light 44 reflected from the display surface 23 enters the second fiber end 42 of the fiber optic cable that was vibrated by the piezoelectric actuator 32 and is directed to a photodetector that measures the received light and determines the properties of the received light. For the display and testing systems 12, 51, 61, and 79 the light 44 is received by the second fiber end 42 of the associated fiber-optic cable 30, second fiber-optic cable 55, second fiber-optic cable 65, and fourth fiber-optic cable 78 and is directed to the photodetector 36 and is filtered by the bandpass filter 34 in the display and testing systems 12, 51, and 61 prior to being received by the photodetector 36. The photodetectors 36 measure the received light and determine properties of the received light. For the display and testing system 82 the light 44 received by the second fiber end 42 of the fifth fiber-optic cable 86 is directed to the fiber-optic filter/separator 58 which filters and separates the light 44 into a first, second and third filtered light 60, 62, and 64 which are transmitted to a first, second, and third photodetector 95, 97, and 99 which measure the received light and determine properties of the received light.

The properties of the received light may be compared to expected properties of the received light to determine the functionality of the display surface 23 displaying a projected image 24. Optionally, the light 44 may be filtered to have the light 44 contain certain properties based on the ability of the receiving photodetector to be able to measure the received light and determine properties of the received light so that the functionality of the display surface 23 displaying an image based on the properties of the light provided by an activated light source may be determined. As a non-limiting example, as possible in the display and testing system 82, multiple light sources 67, 68, and 69 emitting different lights 71, 73, and 75 may be activated and multiple photodetectors 95, 97, and 99 may be utilized to determine the functionality of the display surface 23 to display an image based on the various lights provided by the various activated light sources and may allow a determination of the display surface 23 being incapable or capable of displaying an image based on a specific property of the light, such as its color.

The light 44 may include ambient illumination that passes through the windshield 16. Optionally, the ambient illumination can be determined and removed from the determination of the functionality of the display surface 23 to display an image 24. The current ambient illumination can be determined by a photodetector by deactivating all light sources and measuring the light received by the photodetector. The light sources to be evaluated can then be activated and the associated photodetector can measure the light received and subtract or remove the determined current ambient illumination to determine the properties of the light received based on the activated light sources and determine the functionality of the display surface 23 to display an image 24 based on the activated light sources.

Figure 8:
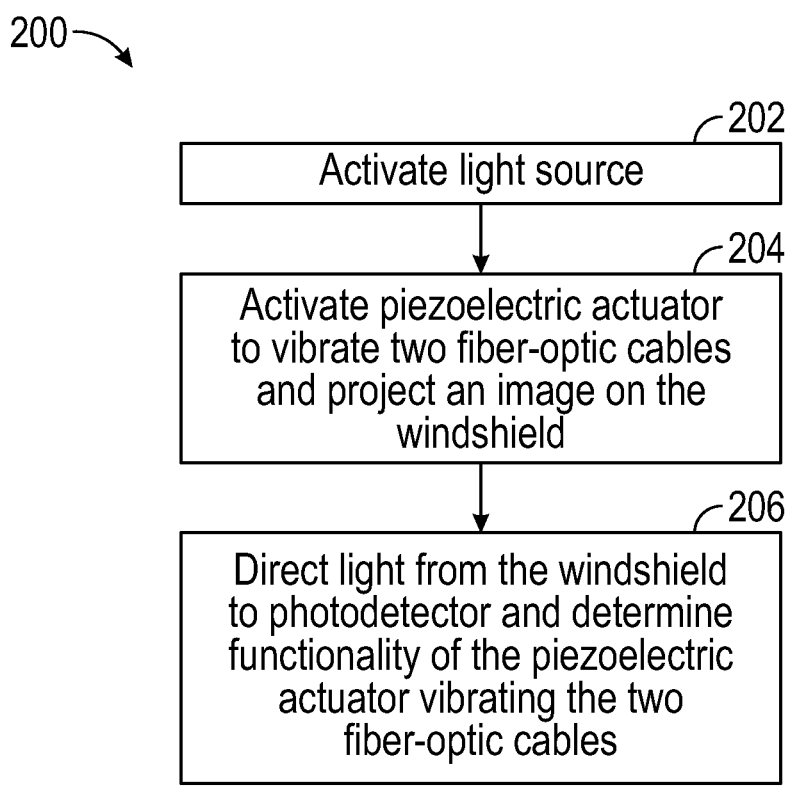
FIG. 8 is a method for using the display and testing systems described in the present disclosure to determine the functionality of the piezoelectric actuator vibrating the ends of two fiber-optic cables together when projecting an image from one of the fiber-optic cables.

Referring now to FIG. 8, a testing method 200 for using the display and testing systems 61 and 82 to determine the functionality of a piezoelectric actuator 32 that is coupled to two fiber-optic cables at a location adjacent to the second fiber ends 42 and that is intended to simultaneously vibrate both of the second fiber ends 42 of the two fiber-optic cables together when projecting an image 24 from one of the fiber-optic cables according to the principles of the present disclosure is shown. The testing method 200 begins at step 202 wherein the controller 38 in the display and testing system 61 activates the light source 26 to emit the light 39 to the first fiber-optic cable 63 which is coupled along with the second fiber-optic cable 65 to the piezoelectric actuator 32 and in the display and testing system 82 activates at least one of the light sources 67, 69, and 69 to emit at least one of the first, second and third lights 71, 73, and 75 which pass through the fiber-optic combiner 56 and is directed to the fourth fiber-optic cable 84 which is coupled along with the fifth fiber-optic cable 86 to the piezoelectric actuator 32. The testing method 200 then proceeds to step 204.

At step 204, the controller 38 activates the piezoelectric actuator 32 and causes the image 24 to be projected onto the display surface 23 of the windshield 16 by activating the piezoelectric actuator 32 using an algorithm that causes the piezoelectric actuator 32 to vibrate the second end 42 of the fiber-optic cable that emits the light to the display surface 23 to create/project required images. In the display and testing system 61 the activated piezoelectric actuator 32 vibrates the second fiber ends 42 of the first and second fiber-optic cables 63 and 65 together while the first fiber-optic cable 63 projects the image 24 onto the display surface 23 and the second fiber ends 42 of the first and second fiber-optic cables 63 and 65 are supposed to vibrate together simultaneously and in the display and testing system 82 the activated piezoelectric actuator 32 vibrates the second fiber ends 42 of the fourth and fifth fiber-optic cables 84 and 86 together while the fourth fiber-optic cable 84 projects the image 24 onto the display surface 23 and the second fiber ends 42 of the fourth and fifth fiber-optic cables 84 and 86 are supposed to vibrate together simultaneously. The testing method 200 then proceeds to step 206.

At step 206, the light 44 from the windshield 16 is received by the vibrating second fiber end 42 of the second fiber optic cable 65 in the display and testing system 61 and is received by the vibrating second fiber end 42 of the fifth fiber-optic cable 86 in the display and testing system 82. In the display and testing system 61, the second fiber-optic cable 65 directs the received light 44 through the bandpass filter 34 to the photodetector 36. In the display and testing system 82, the fifth fiber-optic cable 86 directs the received light 44 through the fiber filter/separator 58 to the first, second and third photodetectors 95, 97, and 99. The photodetectors 36, 95, 97 and 99 measure the received light 44 and determine if the light 44 includes any portion of the image 24 projected by the simultaneously vibrating light emitting first and fourth fiber-optic cables 63 and 84. Optionally, the light 44 may be filtered in the display and testing system 61 by the bandpass filter 34 to facilitate the photodetector 36 being able to determine that the filtered light 46 includes any portion of the projected image 24 and may be filtered in the display and testing system 82 by the fiber filter/separator 58 to facilitate the first, second and third photodetectors 95, 97, and 99 being able to determine that the first, second and third filtered lights 60, 62, and 64 include any portion of the projected image 24. Inclusion of a portion of the projected image 24 in the light 44 indicates that the piezoelectric actuator 32 is coupled to and vibrating the second fiber ends 42 of both the first and second fiber-optic cables 63 and 65 in the display and testing system 61 and of both the fourth and fifth fiber-optic cables 84 and 86 in the display and testing system 82. Determination that the piezoelectric actuator 32 is coupled to and vibrating the second fiber ends 42 of both the first and second fiber-optic cables 63 and 65 indicates that the piezoelectric actuator 32 is functional in the display and testing system 61 and of both the fourth and fifth fiber-optic cables 84 and 86 indicates that the piezoelectric actuator 32 is functional in the display and testing system 82.

The display and testing systems 12, 51, 61, 79 and 82 according to the present disclosure provides many advantages. At least one of the light sources 26 may be configured as a light-emitting diode (LED) array to maximize the life of the light source 26. Due to the length of the fiber-optic cables 30 (e.g., between ten and twenty feet), the light sources 26, photodetectors 36, band pass filters 34, fiber-optic combiner/separators 52 and 70, fiber-optic combiners 56 and fiber filter/separators 58 may be positioned far from the display surface 23 of the windshield 16 to optimize automotive package. The display and testing systems 12, 51, 61, 79 and 82 don't require a projection system directly in front of the windshield 16 and the components and possibly the whole projector portion of the display and testing systems 12, 51, 61, 79 and 82 can be mounted under seats, under the dashboard 22, in the A-pillars 18, above a headliner or any hidden space. The display and testing systems 12, 51, 61, 79 and 82 may eliminate the requirements of occupying interior space of the vehicle 10. As a non-limiting example, the fiber-optic cables 30 may be between ten and twenty feet long. The display and testing systems 12, 51, 61, 79 and 82 may eliminate the requirements of occupying interior space of the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A display and testing system for a vehicle having a display surface, comprising:
   a light source configured to emit a light when activated;
   a fiber-optic cable having a first fiber end and a second fiber end opposite the first fiber end, the first fiber end receiving the light from the light source and directing the light from the light source to the second fiber end, and the second fiber end emitting the light to the display surface;
   a piezoelectric actuator coupled to the fiber-optic cable adjacent the second fiber end, wherein the piezoelectric actuator is actuated to vibrate the second fiber end to project an image on the display surface while the light source is activated; and
   a photodetector configured to detect light, wherein the second fiber end receives the image reflected from the display surface and directs the image to the first fiber end, the first fiber end emits and directs the image to the photodetector, and the photodetector detects functionality of the display surface based on the image while the light source is activated.

2. The display and testing system of claim 1, further comprising a dichroic mirror adjacent the first fiber end, wherein the light source emits the light to the dichroic mirror, the dichroic mirror directs the light from the light source into the first fiber end, and the dichroic mirror allows the image emitted from the first fiber end to pass through the dichroic mirror to the photodetector.

3. The display and testing system of claim 2, further comprising a bandpass filter disposed between the dichroic mirror and the photodetector, wherein the bandpass filter receives the image from the dichroic mirror, filters the image, and directs a filtered image to the photodetector.

4. The display and testing system of claim 1, further comprising a fiber-optic combiner/separator coupled to the first fiber end, the light source, and the photodetector, wherein the fiber-optic combiner/separator directs the light from the light source to the first fiber end and directs the image emitted from the first fiber end to the photodetector.

5. The display and testing system of claim 4, further comprising a bandpass filter disposed between the photodetector and the fiber-optic combiner/separator, wherein the bandpass filter receives the image from the fiber-optic combiner/separator, filters the image, and directs a filtered image to the photodetector.

6. The display and testing system of claim 1, further comprising a controller in electrical communication with the light source and the photodetector, the controller including a processor and a memory, the memory including instructions such that the processor is programmed to:
   activate and deactivate the light source;
   determine ambient illumination of the display surface by deactivating the light source and measuring the light received by the photodetector; and
   determine the functionality of the display surface displaying the image by activating the light source, measuring the image received by the photodetector and subtracting the ambient illumination such that the image based solely on the light source is determined and the functionality of the display surface displaying the image is determined.

7. A display and testing system for a vehicle having a display surface, comprising:
   a light source configured to emit a light when activated;
   a first fiber-optic cable and a second fiber-optic cable each having a first fiber end and a second fiber end opposite the first fiber end, the first fiber-optic cable first fiber end receiving the light from the light source and directing the light from the light source to the first fiber-optic cable second fiber end, and the first fiber-optic cable second fiber end emitting the light to the display surface;
   a piezoelectric actuator coupled to the first fiber-optic cable adjacent the first fiber-optic cable second fiber end and to the second fiber-optic cable adjacent the second fiber-optic cable second fiber end, wherein the piezoelectric actuator is actuated to vibrate the first fiber-optic cable second fiber end to project an image on the display surface while the light source is activated and to vibrate the second fiber-optic cable second fiber end with the first fiber-optic cable second fiber end; and
   a photodetector configured to detect light, wherein the second fiber-optic cable second fiber end receives the image reflected from the display surface and directs the image to the second fiber-optic cable first fiber end, the second fiber-optic cable first fiber end emits and directs the image to the photodetector, and the photodetector detects functionality of the display surface based on the image while the light source is activated.

8. The display and testing system of claim 7, further comprising a controller in electrical communication with the light source, the photodetector, and the piezoelectric actuator, the controller including a processor and a memory, the memory including instructions such that the processor is programmed to:
   activate and deactivate the light source;
   activate the piezoelectric actuator to vibrate the first fiber-optic cable second fiber end to project an image on the display surface while the light source is activated; and
   determine the functionality of the piezoelectric actuator vibrating both the first fiber-optic cable and the second fiber-optic cable by determining that an image from the display surface is received by the photodetector when the light source is activated and the piezoelectric actuator vibration is activated.

9. The display and testing system of claim 7, further comprising a bandpass filter disposed between the second fiber-optic cable first fiber end and the photodetector, wherein the bandpass filter receives the image from the second fiber-optic cable first fiber end, filters the image, and directs a filtered image to the photodetector.

10. The display and testing system of claim 7, further comprising a controller in electrical communication with the light source and the photodetector, the controller including a processor and a memory, the memory including instructions such that the processor is programmed to:
    activate and deactivate the light source;

determine ambient illumination of the display surface by deactivating the light source and measuring the light received by the photodetector; and determine the functionality of the display surface displaying the image by activating the light source, measuring the image received by the photodetector and subtracting the ambient illumination such that the image based solely on the light source is determined and the functionality of the display surface displaying the image is determined.

11. A display and testing system for a vehicle having a display surface, comprising:
  a first light source configured to emit a first light when activated into a first fiber-optic cable;
  a second light source configured to emit a second light when activated into a second fiber-optic cable, the second light being different than the first light;
  a third light source configured to emit a third light when activated into a third fiber-optic cable, the third light being different than the first light and the second light;
  a first photodetector configured to detect light received from a fourth fiber-optic cable; and
  a piezoelectric actuator,
  wherein when the first light source, the second light source, and the third light source are activated, the respective first light, second light, and third light are emitted to the display surface, the piezoelectric actuator vibrates to cause the first light, the second light, and the third light to project an image on the display surface, and the first photodetector receives the image reflected from the display surface via the fourth fiber-optic cable and detects functionality of the display surface based on the image while at least one of the light sources is activated.

12. The display and testing system of claim 11, further comprising:
  a fifth fiber-optic cable having a first fiber end and a second fiber end opposite the first fiber end; and
  a fiber-optic combiner/separator operable to combine light received from multiple fiber-optic cables and to separate received light between multiple fiber-optic cables,
  wherein the first fiber-optic cable, the second fiber-optic cable, and the third fiber-optic cable emit the first light, the second light, and the third light to the fiber-optic combiner/separator, the fiber-optic combiner/separator directs the received first light, second light, and third light into the first fiber end, the first fiber end directs light received from the fiber-optic combiner/separator to the second fiber end, the piezoelectric actuator is coupled to the fifth fiber-optic cable adjacent the second fiber end and vibrates the second fiber end when actuated, the second fiber end emits the light received from the first fiber end to the display surface, the second fiber end receives the image reflected from the display surface and directs the image to the first fiber end, the first fiber end emits the image to the fiber-optic combiner/separator, and the fiber-optic combiner/separator directs the image to the first photodetector through the fourth fiber-optic cable.

13. The display and testing system of claim 12, further comprising a controller in electrical communication with the light sources, the piezoelectric actuator, and the first photodetector, the controller including a processor and a memory, the memory including instructions such that the processor is programmed to:
  activate and deactivate the light sources;
  determine ambient illumination of the display surface by deactivating the light sources and measuring the light received by the first photodetector; and
  determine the functionality of the display surface displaying the image by activating the light sources, measuring the image received by the first photodetector and subtracting the ambient illumination such that the image based solely on the light sources is determined and the functionality of the display surface displaying the image is determined.

14. The display and testing system of claim 12, further comprising a controller in electrical communication with the light sources, the piezoelectric actuator, and the first photodetector, the controller including a processor and a memory, the memory including instructions such that the processor is programmed to:
  to separately activate and deactivate the light sources so that a single light source can be activated while all other light sources are deactivated;
  determine the functionality of the display surface displaying the image with respect to the first light source by activating the first light source while the second light source and the third light source are deactivated and measuring the image received by the first photodetector;
  determine the functionality of the display surface displaying the image with respect to the second light source by activating the second light source while the first light source and the third light source are deactivated and measuring the image received by the first photodetector; and
  determine the functionality of the display surface displaying the image with respect to the third light source by activating the third light source while the first light source and the second light source are deactivated and measuring the image received by the first photodetector.

15. The display and testing system of claim 11, further comprising:
  a second photodetector configured to detect light received from a fifth fiber-optic cable;
  a third photodetector configured to detect light received from a sixth fiber-optic cable; and
  a seventh fiber-optic cable and an eighth fiber-optic cable each having a first fiber end and a second fiber end opposite the first fiber end,
  wherein the seventh fiber-optic cable first fiber end receives the first light, the second light, and the third light and directs received light to the seventh fiber-optic cable second fiber end, the seventh fiber-optic cable second fiber end emits the received light to the display surface, the piezoelectric actuator is coupled to the seventh fiber-optic cable adjacent the seventh fiber-optic cable second fiber end and to the eighth fiber-optic cable adjacent the eighth fiber-optic cable second fiber end, the piezoelectric actuator is actuated to vibrate the seventh fiber-optic cable second fiber end to project an image on the display surface while the light sources are activated and to vibrate the eighth fiber-optic cable second fiber end with the seventh fiber-optic cable second fiber end, the eighth fiber-optic cable second fiber end receives the image reflected from the display surface and directs the image to the eighth fiber-optic cable first fiber end, the eighth fiber-optic cable first fiber end directs the image to the photodetectors, and the photodetectors detect functionality of the display surface based on the image received while the light sources are activated.

16. The display and testing system of claim 15, further comprising a fiber-optic combiner coupling the first, second and third fiber-optic cables to the seventh fiber-optic cable first fiber end and directing the first, second, and third lights into the seventh fiber-optic cable first fiber end.

17. The display and testing system of claim 15, wherein each photodetector is configured to detect different light wavelengths and further comprising a bandpass filter receiving the image from the eighth fiber-optic cable first fiber end, the bandpass filter filtering the image into three different filtered images, and sending a first filtered image to the first photodetector, a second filtered image to the second photodetector, and a third filtered image to the third photodetector.

18. The display and testing system of claim 15, further comprising a controller in electrical communication with the light sources, the piezoelectric actuator, and the photodetectors, the controller including a processor and a memory, the memory including instructions such that the processor is programmed to:
   activate and deactivate the light sources;
   determine ambient illumination of the display surface by deactivating the light sources and measuring the light received by the photodetectors; and
   determine the functionality of the display surface displaying the image by activating the light sources, measuring the image received by the photodetectors and subtracting the ambient illumination such that the image based solely on the light sources is determined and the functionality of the display surface displaying the image is determined.

19. The display and testing system of claim 15, further comprising a controller in electrical communication with the light sources, the photodetectors, and the piezoelectric actuator, the controller including a processor and a memory, the memory including instructions such that the processor is programmed to:
   activate and deactivate the light sources;
   activate the piezoelectric actuator to vibrate the seventh fiber-optic cable second fiber end to project the image on the display surface while one or more of the light sources are activated and vibrate the eighth fiber-optic cable second fiber end with the seventh fiber-optic cable second fiber end; and
   determine the functionality of the piezoelectric actuator vibrating both the seventh fiber-optic cable second fiber end and the eighth fiber-optic cable second fiber end by determining that an image from the display surface is received by one or more of the photodetectors when one or more of the light sources are activated and the piezoelectric actuator vibration is activated.

20. The display and testing system of claim 15, further comprising a controller in electrical communication with the light sources, the piezoelectric actuator, and the photodetectors, the controller including a processor and a memory, the memory including instructions such that the processor is programmed to:
   to separately activate and deactivate the light sources so that a single light source can be activated while all other light sources are deactivated;
   determine the functionality of the display surface displaying the image with respect to the first light source by activating the first light source while the second light source and the third light source are deactivated and measuring the image received by the first photodetector;
   determine the functionality of the display surface displaying the image with respect to the second light source by activating the second light source while the first light source and the third light source are deactivated and measuring the image received by the second photodetector; and
   determine the functionality of the display surface displaying the image with respect to the third light source by activating the third light source while the first light source and the second light source are deactivated and measuring the image received by the third photodetector.

* * * * *